(12) United States Patent
Fonseca de Oliveira et al.

(10) Patent No.: US 10,887,151 B2
(45) Date of Patent: Jan. 5, 2021

(54) METHOD FOR DIGITAL VIDEO TRANSMISSION ADOPTING PACKAGING FORWARDING STRATEGIES WITH PATH AND CONTENT MONITORING IN HETEROGENEOUS NETWORKS USING MMT PROTOCOL, METHOD FOR RECEPTION AND COMMUNICATION SYSTEM

(71) Applicants: SAMSUNG ELETRÔNICA DA AMAZÔNIA LTDA., São Paulo (BR); UNIVERSIDADE ESTADUAL DE CAMPINAS—UNICAMP, São Paulo (BR)

(72) Inventors: Jean Felipe Fonseca de Oliveira, Campinas (BR); Samira Afzal, Campinas (BR); Vanessa Testoni, Campinas (BR); Christian Rodolfo Esteve Rothenberg, Valinhos (BR)

(73) Assignees: SAMSUNG ELETRÔNICA DA AMAZÔNIA LTDA., São Paulo (BR); UNIVERSIDADE ESTADUAL DE CAMPINAS—UNICAMP, São Paulo (BR)

( * ) Notice: Subject to any disclaimer, the term of this patent is extended or adjusted under 35 U.S.C. 154(b) by 0 days.

(21) Appl. No.: 16/387,249

(22) Filed: Apr. 17, 2019

(65) Prior Publication Data
US 2020/0112472 A1 Apr. 9, 2020

(30) Foreign Application Priority Data

Oct. 5, 2018 (BR) .............................. 2018 070605 5
Dec. 21, 2018 (BR) .............................. 2018 076952 9

(51) Int. Cl.
*H04L 29/06* (2006.01)
*H04L 12/853* (2013.01)
*H04L 12/707* (2013.01)

(52) U.S. Cl.
CPC .. *H04L 29/06088* (2013.01); *H04L 29/06523* (2013.01); *H04L 45/24* (2013.01); *H04L 47/2416* (2013.01)

(58) Field of Classification Search
None
See application file for complete search history.

(56) References Cited

U.S. PATENT DOCUMENTS 6,339,450 B1 * 1/2002 Chang .................. H04N 19/147
348/192
7,720,065 B2 * 5/2010 Liu ..................... H04L 47/2416
370/389

(Continued)

OTHER PUBLICATIONS

Jiyan Wu, et al. "Bandwidth-Efficient Multipath Transport Protocol for Quality-Guaranteed Real-Time Video Over Heterogeneous Wireless Networks", IEEE Transactions on Communications, vol. 64, No. 6, Jun. 2016, p. 2477-2493 (17 pages).

(Continued)

*Primary Examiner* — Parth Patel
*Assistant Examiner* — Berhanu D Belete (57) ABSTRACT

Method for digital video transmission in real time to multi-homed devices over heterogeneous networks by adopting a packaging forwarding strategy with path and content monitoring to the MPEG media transport protocol (MMT), method for reception and communication system, wherein a sender side has four modules: video parser, feedback packet receiving module, scheduler module and packet transmitter, and a receiver side has six modules: packet receiver, statistics calculator, feedback packet sender, reassembler, video decoder and video renderer.

8 Claims, 8 Drawing Sheets

(56) References Cited

U.S. PATENT DOCUMENTS

| | | | | |
|---|---|---|---|---|
| 9,240,917 | B2* | 1/2016 | Chen | H04L 27/2602 |
| 9,240,956 | B2* | 1/2016 | Chen | H04L 27/2627 |
| 2002/0116715 | A1 | 8/2002 | Apostolopoulos | |
| 2007/0201365 | A1 | 8/2007 | Skoog et al. | |
| 2008/0259799 | A1 | 10/2008 | Van Beek | |
| 2009/0219937 | A1* | 9/2009 | Liu | H04L 47/2433 |
| | | | | 370/392 |
| 2014/0036999 | A1 | 2/2014 | Ryu et al. | |
| 2014/0317674 | A1* | 10/2014 | Hwang | H04N 21/631 |
| | | | | 725/118 |
| 2015/0026719 | A1* | 1/2015 | Menon | H04N 21/812 |
| | | | | 725/34 |
| 2015/0207715 | A1 | 7/2015 | Ozawa | |
| 2016/0056927 | A1* | 2/2016 | Liu | H04L 47/54 |
| | | | | 370/216 |
| 2016/0173812 | A1* | 6/2016 | Suh | H04N 21/6125 |
| | | | | 725/32 |
| 2016/0182976 | A1* | 6/2016 | Kwon | G11B 27/10 |
| | | | | 725/118 |
| 2016/0373342 | A1 | 12/2016 | Kolan et al. | |
| 2019/0261047 | A1* | 8/2019 | Kwon | H04L 65/80 |
| 2020/0137428 | A1* | 4/2020 | Zhang | H04N 21/24 |

OTHER PUBLICATIONS

Jiyan Wu, et al. "Streaming High-Quality Mobile Video with Multipath TCP in Heterogeneous Wireless Networks", IEEE Transactions On Mobile Computing, vol. 15, No. 9, Sep. 2016, p. 2345-2361 (17 pages).

Changqiao Xu, et al. "CMT-QA: Quality-Aware Adaptive Concurrent Multipath Data Transfer in Heterogeneous Wireless Networks", IEEE Transactions on Mobile Computing, vol. 12, No. 11, Nov. 2013, p. 2193-2205 (13 pages).

Jiyan Wu, et al. "Content-Aware Concurrent Multipath Transfer for High-Definition Video Streaming over Heterogeneous Wireless Networks", IEEE Transactions on Parallel and Distributed Systems, vol. 27, No. 3, Mar. 2016, p. 710-723 (14 pages).

Jiyan Wu, et al. "Goodput-Aware Load Distribution for Real-Time Traffic over Multipath Networks", IEEE Transactions on Parallel and Distributed Systems, vol. 26, No. 8, Aug. 2015, p. 2286-2299 (14 pages).

Bo Han, et al. "MP-DASH: Adaptive Video Streaming Over Preference-Aware Multipath", CoNEXT '16, Dec. 12-15, 2016, Irvine, CA, USA, DOI: http://dx.doi.org/10.1145/2999572.2999606, p. 129-143 (15 pages).

* cited by examiner

Table X: RQF message fields

| Field | Number of Bits |
|---|---|
| message ID | 16 |
| version | 8 |
| length | 16 |
| measurement duration | 16 |
| packet loss ratio | 8 |
| inter arrival time | 32 |
| propagation delay | 32 |
| feedback timestamp | 32 |

802 — packet loss ratio
803 — inter arrival time
804 — propagation delay

805

Table Y: NAM message fields

| Field | Number of Bits |
|---|---|
| message ID | 16 |
| version | 8 |
| length | 16 |
| CL ID | 8 |
| available bit rate | 32 |
| buffer fullness | 32 |
| peak bit rate | 32 |
| current delay | 32 |
| SDU size | 32 |
| SDU loss ratio | 32 |
| generation time | 32 |
| BER | 32 |

806 — available bit rate
807 — current delay

| Video sequence | Scheduling strategy | Total packet loss rate | I and NI frame packet loss rate | PSNR | SSIM |
|---|---|---|---|---|---|
| Elephants Dream | Path-and-content-aware | 2.6% | 0.8% | 39.56 dB | 0.942 |
| | Evenly split | 23.48% | 8.5% | 27.24 dB | 0.768 |
| Big Buck Bunny | Path-and-content-aware | 4.2% | 1.6% | 32.54 dB | 0.893 |
| | Evenly split | 27.4% | 12.89% | 21.13 dB | 0.749 |

FIGURE 13

METHOD FOR DIGITAL VIDEO TRANSMISSION ADOPTING PACKAGING FORWARDING STRATEGIES WITH PATH AND CONTENT MONITORING IN HETEROGENEOUS NETWORKS USING MMT PROTOCOL, METHOD FOR RECEPTION AND COMMUNICATION SYSTEM

CROSS-REFERENCE TO RELATED APPLICATIONS

This application claims the priority benefit of Brazilian Patent Application No. 10 2018 070605 5, filed Oct. 5, 2018, and Brazilian Patent Application No. 10 2018 076952 9, filed Dec. 21, 2018, the disclosures of which are incorporated herein by reference.

TECHNICAL FIELD

The present invention relates to a method and system for improving the multi-channel features of the MMT (MPEG Media Transport) protocol, increasing the quality of experience (Quality of Experience—QoE) to the end user.

BACKGROUND OF THE INVENTION

In recent years, streaming service companies have experienced a rapid increase in its viewers databases, achieving millions of subscribers and billions of watched video hours every month. In 2017, Cisco disclosed a report in which it was estimated that, from 2016 to 2021, IP traffic will grow almost three times and more than 63% of the same being composed of wireless and mobile devices. In addition, by 2021, from all consumer Internet traffic, a percentage of 82% therefrom will be from the IP video traffic.

Streaming services require media data to be transmitted with significantly low delay and high fidelity. Otherwise, the result would be unsatisfactory for the final user. However, with such requirements, the burden on telecommunication companies is significantly increased and congestion situations may become dangerously frequent, once bandwidth capacity growth cannot match data consumption. Despite the development of new network's infrastructure, Internet media streaming applications still suffer from jitter and packet losses. Such conditions demand system improvements in order to cope with the demand on multimedia content in years to come.

One of the possible solutions may be the use of multipath media streaming systems. A noticeable change in the scenario of digital media transmission is the current diversity of delivery channels and the fact that, today, the Internet and mobile networks can be promptly used due to their high transmission capacities in addition to the traditional broadcasting channels. Since video transmission can potentially increase the amount of congestion over the networks, a single delivery channel may not be anymore an efficient way for transmitting video. Besides, an increasing number of fixed and mobile devices are already capable of handling more than one network interface and thus can be connected to more than one delivery channel. Such devices are classified as multihomed terminals (with multiple network connections) and their use can potentially overcome network limitations by increasing bandwidth and balancing the load on multiple network interfaces of possibly different technologies, also called heterogeneous, between the media server and client devices.

The proliferating wireless infrastructure offers a variety of broadband access options such as cellular networks, wireless metropolitan area networks IEEE 802.16/WiMAX (world-wide interoperability for microwave access), broadband wireless access/Mobile-Fi IEEE 802.20, wireless local area networks (WLAN)/Wi-Fi IEEE 802.11 and wireless personal area networks (WPAN) IEEE 802.15. To improve the system throughput, the multi-channel and multi-radio (heterogeneous network) capabilities can be exploited to concurrent transmissions over multiple wireless links.

It is important to note that the content is more important than its delivery paths and users just want to have easy access to high-quality content. Therefore, the operations of broadcast and broadband networks must be harmonized so that users can make use of the content without necessarily being aware of the multiple delivery channels. However, this information may also be available to the user, depending on the use case scenario.

The present invention, as will be further detailed in the remainder of this text, is an improvement proposed for a multipath media delivery system based on the MMT (MPEG Media Transport) protocol. This protocol was designed specifically to support the transport of multimedia over heterogeneous network delivery environments, including next-generation broadcasting systems. MMT is part of the ISO/IEC 23008 High Efficiency Coding and Media Delivery in Heterogeneous Environments (MPEG-H) standard suite. In addition, it inherits some characteristics of the MPEG-2 TS broadcasting protocol, such as content agnostic media distribution, easy conversion between storage and delivery format, and support for multiplexing media streams.

In the present invention, MMT is improved with a novel path-and-content-aware packet scheduling strategy by means of a full cooperation between some available network metrics and video content features. This strategy improves the scheduling capabilities of MMT when applied to multipath environments where the streaming services face all the challenges mentioned above. It aims to select the best channel for transmitting each video packet and provides better models to cope with unstable communication channels to improve overall resulting Quality of Experience (Quality of Experience—QoE) of the final user. Therefore, the present invention is an interesting solution for the next generation of broadband/broadcast hybrid video streaming systems, such as ATSC 3.0 and Super HiVision, which have already adopted the original MMT protocol.

Patent document US 2016/0373342 A1, entitled "METHOD AND APPARATUS FOR MULTIPATH MEDIA DELIVERY", published on Dec. 22, 2016, proposes a method to establish multipath delivery using MMT. In this method, the MMT protocol uses signaling protocols, such as RTSP or HTTP to establish and control multipath sessions between sender and receiver (transport connection could be either TCP or UDP). For example, the RTSP, the client and server can be aware of the multipath capability by sending OPTIONS request to each other. Similarly, while the HTTP is used to set up multipath sessions, the client includes a specific header to tell the server about its multipath capability. It is also possible to add or drop a network path during the connection. While the media is being transmitted, the MMT periodically sends feedback to the sender to inform about the path quality information (e.g. loss, delay, and jitter). Therefore, the sender could monitor the different paths' situations and dynamically selects better performing paths for the packet transmission. However, this approach focuses on establishment of the multi-path delivery system and does not go into details of scheduling strategy, load balancing and does not consider video content information.

Patent document US 2015/0207715 A1 entitled "RECEIVING APPARATUS, TRANSMITTING APPARATUS, COMMUNICATION SYSTEM, CONTROL METHOD FOR RECEIVING APPARATUS, CONTROL METHOD FOR TRANSMITTING APPARATUS, AND RECORDING MEDIUM", published on Jul. 23, 2015, proposes a method for video data transmission. In this method, the bandwidth is predicted considering the decoding delay. According to the prediction results are predicted, the number of packets to be transmitted through each path is determined. An eventual similarity with the method proposed in the present invention is the fact that video traffic splitting is based on path condition estimation (bandwidth). Differently, in contrast with the present invention, document US 2015/0207715 A1 does not discard any package and does not consider video content for data transmission.

In the patent document US 2002/0116715 A1 entitled "VIDEO COMMUNICATION METHOD AND SYSTEM Employing MULTIPLE STATE ENCODING AND PATH DIVERSITY", published on Aug. 22, 2002, the video encoder needs to be instrumented or modified to be able to adapt its coding performance according to the monitored network metrics. Instead, the present invention adds a video bitstream parser capable of reading the information of the frame type. Therefore, the encoder keeps unchanged. Additionally, implementing the performance control logic into the encoder may lead to a significant increase in complexity of the overall system. This technique only applies to live transmission, while the present invention fits for live and on-demand transmission scenarios.

The patent document US 2008/0259799 A1 entitled "PACKET SCHEDULING WITH QUALITY-AWARE DROPPING FRAME FOR VIDEO STREAMING", published on Oct. 23, 2008, describes a method of packet transmission scheduling considering network related information (such as available bandwidth and delay) in order to minimize distortion and maximize quality for the content provided to the end user. Based on feedback from the receiver and lookup tables, possibly overdue packets and PSNR values are calculated in order to estimate distortion. Based on this estimated distortion and a selected scheduling pattern (from a set of possible patterns disclosed in the body of the patent), packets with minimal influence on quality are discarded. Differently, this patent uses estimation distortion of decoded packets as discarding strategy, while the present invention uses a Hidden Markov model for its discard strategy. The estimation method used in patent US 2008/0259799 A1 is necessary since it has pre-defined possible scheduling patterns it can apply to evaluate packet priority, while the present invention considers only one, in which I frames are of highest priority, followed by NI and P frames.

Patent document US 2007/0201365 A1 entitled "VIDEO PACKET MULTIPLEXER WITH INTELLIGENT PACKET DISCARD", published on Aug. 30, 2007, describes a technique based on selectively discard video packets from a memory queue according to the detection of network congestion. It develops a delay-guaranteed condition where a packet that will not reach the destination below a certain time limit, will not be sent to the receiver and consequently discarded. Differently, as stated before, the present invention relies on information about the path status (delay, jitter, packet loss and goodput) and video frame type to feed its scheduling and discard strategies.

The patent document US 2014/0036999 A1 entitled "PRIORITIZATION FRAME BASED ON PREDICTION INFORMATION", published on Feb. 6, 2014, describes a priority information retrieval system that may be used to distinguish between different types of video data, such as different video packets or video frames. The priority level is defined by the number of video frames that reference one specific video frame, which is defined according to the frame hierarchy structure. The information of priority level may be indicated in the header of a video packet or by a signaling protocol. In the present invention, only the video frame type, e.g. I or P, is used and extracted from the header of the encoded frame.

The article entitled "BANDWIDTH-EFFICIENT MULTIPATH TRANSPORT PROTOCOL FOR QUALITY-GUARANTEED REAL-TIME VIDEO OVER HETEROGENEOUS WIRELESS NETWORKS" by J. Wu, Yuen B., Cheng Y., Y. Wang, and J. Chen, in *IEEE Transactions on Communications*, vol. 64, no. 6, p. 2477-2493, 2016, is also known as BEMA, due to the acronym of the proposed technique. It discloses a protocol that uses Raptor coding and priority-aware scheduling to stream HD real-time video over heterogeneous wireless networks. One eventual similarity to the present invention is the fact that BEMA technique estimates paths' qualities and uses a method to balance the data over the available paths. Another similarity to the present invention is the fact that BEMA technique considers video content parameters for scheduling. However, the rules to find paths' qualities, load balancing and for scheduling strategies are different from what is proposed in the present invention. For example, while BEMA technique sends I-frame packets through all available paths and P-frame packets on the estimated best paths, the present invention defines different scheduling rules for I-, NI- and P-frame packets based on the estimated path conditions and Markov model prediction. Yet another similarity to the present invention is the fact that BEMA technique has a discard strategy at the sender. However, the strategy is different from what is defined in the present invention. For example, while BEMA discards the video frame with largest distortion, in the present invention, packets with less priority are discarded based on path condition estimation (according to a Markov Model). Differently from the present invention, in BEMA technique, ZigZag scheme is used for congestion detection and to find FEC parameters (e.g., code rate and symbol size), but in the present invention, a scheme aligned with network metrics (e.g., highest one-way delay and packet loss rate) is considered to classify the associated network paths. This classification is further used for scheduling strategy. Furthermore, in BEMA technique, feedback packet is customized, but in the present invention, the standardized MMT signaling message is used, which avoids additional system complexity and protocol changes. In BEMA, feedbacks are periodically sent from the client to the server over a reliable TCP connection. But in the present invention, feedbacks are sent over UDP. Moreover, since BEMA is a transport layer solution, significant modifications in network drivers and lower layers of the operational systems are required to support all the specifications of the BEMA technique, while the present invention is fully implemented in application layer.

The paper entitled "STREAMING HIGH-QUALITY MOBILE VIDEO WITH MULTIPATH TCP IN HETEROGENEOUS WIRELESS NETWORKS", by J. Wu, C. Yuen, B. Cheng, M. Wang and J. Chen, in *IEEE Transactions on Mobile Computing*, vol. 15, no. 9, pp. 2345-2361, 2016, describes a multipath TCP protocol for streaming high-quality mobile video using a multipath TCP connection for heterogeneous wireless networks. ADMIT is an extension of MPTCP. One eventual similarity to the present invention is the fact that ADMIT estimates paths' reliabilities and uses a method to balance the data over the available paths. However, the rules to find paths' qualities and load balancing are different from the present invention. Differently from the present invention, ADMIT uses ZigZag scheme for path condition classifications and then uses it to find FEC parameters (e.g., redundancy and packet size), but in the present approach, a scheme aligned with network metrics (e.g., highest one-way delay and packet loss rate), is considered to classify the associated network paths. Furthermore, in ADMIT, FEC and retransmission are used for packet protection. However, in the present invention, priority of video frames is considered, and different rules are defined based on path conditions to protect I- and NI-frames. In ADMIT, the packet scheduling strategy is not aware of the frame type. Since ADMIT is a transport layer solution, significant modifications in network drivers and lower layers of the operational systems are required to adjust to ADMIT protocol.

The article entitled "CMTQA: QUALITY-AWARE ADAPTIVE CONCURRENT MULTIPATH DATA TRANSFER IN HETEROGENEOUS WIRELESS NETWORKS", by C. Xu, T. Liu, J. Guan, H. Zhang, and G.-M. Muntean, in *IEEE Transactions on mobile Computing*, Vol. 12, n. 11, pp. 2193-2205, 2013, proposes a quality-aware adaptive concurrent multipath transfer (CMT-QA) approach for FTP-like data transmission and real-time video delivery. CMT-QA monitors and estimates each path's quality and adaptively selects the best-qualified paths for concurrent data transfer. CMT-QA schedules data over multiple paths and independently controls the traffic rate of each path. One eventual similarity to the present invention is the fact that CMT-QA estimates paths' qualities and distributes data over paths according to their qualities. However, the rules to find paths' qualities and distribute data are different from what is defined in the present invention. For example, the path quality estimation model (PQEM) implemented in CMT-QA calculates each path quality by estimating the data distribution rate, which is a function of the sending buffer size and the transmission delay. Regarding data distribution, Data Distribution Scheduler (DDS), implemented in CMT-QA, predicts the packet arrival time per path to define the data distribution for each associated network path. Another difference is that CMT-QA does not use any type of content-aware approach.

The article entitled "CONTENT-AWARE CONCURRENT MULTIPATH TRANSFER FOR HIGH-DEFINITION VIDEO STREAMING OVER HETEROGENEOUS WIRELESS NETWORKS", by J. Wu, Yuen C., Wang and J. Chen, *IEEE Transactions on Parallel and Distributed Systems*, Vol. 27), n. 3, pp. 710-723, 2016 proposes a content-aware scheme and incorporates the video content analysis into its packet scheduling for enhancing HD video perceived quality in heterogeneous wireless network environments. One eventual similarity is the fact that video content parameters are used for packet scheduling and different transmission is applied for I-frames and P-frames. However, the rules in CMT-CA are different from what is defined in the present invention. Another similarity is the usage of a discard strategy at the sender when network is congested. Again, the rules in CMT-CA are different from what is defined in the present invention. For example, CMT-CA drops a video frame if it cannot be delivered due to bandwidth restriction, but, in our approach, discard strategy drops low priority packets based on results of Markov model channel condition estimation. Furthermore, CMT-CA estimates path qualities in a different way of what is defined in the present invention. CMT-CA estimates frame level video distortion for this purpose. Differently from the present invention, a congestion control method is defined in CMT-CA, which is based on a Markov model process (MDP). MDP is used for predicting path conditions and the video traffic splitting is defined for load balancing. Another difference is that, in CMT-CA, retransmission is used for packet protection. But in the present invention, content of video packets is considered, and different rules are defined based on path conditions to protect I-frames and NI-frames. Also, CMT-CA relies on SCTP, while the present invention relies on the MMT protocol.

The article entitled "GOODPUT-AWARE LOAD DISTRIBUTION FOR REAL-TIME TRAFFIC OVER MULTIPATH NETWORKS: GALTON", by J. Wu, C. Yuen, B. Cheng, Y. Shang and J. Chen, *IEEE Transactions on Parallel and Distributed Systems*, Vol. 26, no. 8, pp. 2286-2299, 2015, proposes a model in application layer where the receiver monitors network status (e.g., available bandwidth, RTT, PLR) and informs this to the sender via feedback. The sender estimates the path quality based on the reported network information. There is also a flow rate allocator, which is responsible for partitioning flows into sub-flows and assigning them to the available paths to optimize the aggregated goodput. One eventual similarity to the present invention is the fact that this paper estimates paths' qualities and uses a method to balance the data over the available paths. However, the rules to find paths' qualities and load balancing are different from what is defined in the present invention. For example, GALTON derives the solution based on utility theory. Furthermore, GALTON detects congested paths by ZigZag scheme, but in the present approach, a scheme aligned with network metrics (e.g., highest one-way delay, packet loss rate), is considered to classify paths. Additionally, in GALTON, the feedback packets are customized, but in the present invention, pre-defined MMT pattern signaling messages are used, which avoids additional system complexity and protocol changes.

The article entitled "MP-DASH: Adaptive Video Streaming Over Preference-Aware Multipath," by B. Han, F. Qian, L. Ji, V. Gopalakrishnan, and N. Bedminster, *Proceedings of the 12th International on Conference on emerging Networking Experiments and Technologies*, pp. 129-143, 2016, proposes the MP-DASH framework, with the overall goal of enhancing MPTCP to support adaptive video streaming under user-specified interface preferences. MP-DASH is designed as an approach with interaction between application layer and transport layer, which is a similarity with the present invention. In this paper, in order to implement MP-DASH, two components are designed: MP-DASH strategy and MP-DASH video adapter. MP-DASH scheduler is implemented within a MPTCP scheduler with knowledge of network interface preferences and aggregated throughput. MP-DASH video adapter is implemented to integrate the MP-DASH scheduler with DASH rate adaptation mechanisms. MP-DASH is deadline-aware with capabilities to quantify configuration preferences by cost (data usage, energy consumption or a combination of both). The main differences to the present invention are that it is not a content-aware approach and no discard strategy is defined.

SUMMARY

The present invention introduces a method and system to optimize the transmission of digital video for multihomed devices using the MPEG Media Transport (MMT) protocol over heterogeneous networks by means of monitoring the network metrics and video content features in order to increase the quality of experience (QoE) of final users. Multihomed devices are characterized by the presence of more than one network interface and the ability of being simultaneously authenticated in all associated network interfaces.

The main module added by the present invention is called Scheduler module. It is responsible for the monitoring of the current conditions of all delivery channels and can access the video frame type of each network packet. Therefore, the Scheduler module applies a path-and-content-aware scheduling strategy for each packet to be transmitted.

The present invention uses the native MMT signaling protocol to provide the information for the embedded scheduling algorithms.

The present invention uses the one-way delay, packet losses, goodput and video frame type to assess the packet ratio of each associated network path, where goodput is defined as the number of useful information bits delivered by the network to a certain destination per unit of time.

A discard strategy that considers whether the packet would be overdue is implemented. In addition, the packets which are considered of greater priority are either duplicated before transmission or sent through the best quality path to increase its arrival probability, which results in a better QoE for the end user.

The present invention implements an adaptive bit rate variation method in which the better path receives the higher bit rate, but the path given a bad condition label will still be receiving a share of the load in a lower rate.

An embodiment of the present invention describes a method for digital video transmission in real time to multihomed devices over heterogeneous networks by adopting a packaging forwarding strategy with path and content monitoring to the MPEG media transport protocol (MMT) comprising:
extracting the frame type from the video content of each video packet through a video parser on the sender side;
informing a video packet frame type to a scheduler module through the video parser;
receiving periodic feedback packets from a receiver in a feedback packet receiving module that informs the path metrics for the schedule module and discards overdue received feedback packets;
evaluating the paths metrics received in the scheduler module and use them in the process of path scheduling together with the frame type information of the video frame; and
transmitting each video packet to a packet receiver by the packet transmitter module based on the path assignment information received from the scheduler module.

In addition, one embodiment of the present invention also defines a method for receiving real-time digital video in multihomed devices over heterogeneous networks by adopting a packaging forwarding strategy with path and content monitoring to the MPEG media transport protocol (MMT) comprising:
receiving the video packet transmitted in the packet receiving module;
periodically computing path metrics in the statistics calculator after a predefined time interval;
sending through the feedback packet sender module the path metrics computed in a feedback packet back to the sender through the best estimated path by a scheduler module on the receiver side by mounting a plurality of MMT signaling messages;
sending the undelayed packets received by the packaging receiving module to the encoded video bitstream reassembling module;
sending the encoded regrouped bitstream to the video decoder module; and
displaying the decoded video stream through the video renderer module.

The present invention further provides a communication system for transmitting/receiving digital real-time video on multihomed devices over heterogeneous networks by adopting a packet scheduling strategy with path and content monitoring for the MPEG media transport protocol (MMT) wherein:
the transmitter side comprises four modules: video parser, feedback packet receiving module, scheduler module and packet transmitter, wherein:
the video packets are handled by the video parser to extract the frame type from the video content of each data packet;
the video parser module informs the video packet frame type to the scheduler module, which will subsequently use this information in the scheduling process of each packet; the feedback packet receiving module periodically receives feedback packets from the receiver, informs the path metrics for the scheduler module, and discards overdue received feedback packets;
the scheduler module evaluates metrics of the received paths and uses them in the process of path scheduling along with the frame type information of the video frame; and
the packet transmitter module transmits each video packet based on the path assignment information received from the scheduler module;
and the receiver side comprises six modules: packet receiver, statistics calculator, feedback packet sender, reassembler module, video decoder and video renderer, wherein:
the packet receiving module receives the transmitted video packet;
after a predefined time interval, path metrics are periodically computed in the statistics calculator module;
the feedback packet sender module sends this information in a feedback packet back to the sender through the best path by assembling two MMT signaling messages; and
a scheduler module is also implemented on the receiver side to estimate the best path to send this information back to the sender instead of using the same receiving path.

An embodiment of this invention is composed of a user of a MMT multihomed receiver device, e.g. a mobile phone, and an MMT sender, e.g. a video server, both equipped with the features described by this invention. The aforementioned mobile phone is inserted in a multipath media delivery system and connected to, at least, two different networks, such as an IEEE 802.11n (WiFi) network and a LTE 4G mobile network. According to the method disclosed by this invention, the video received by the aforementioned mobile phone will be more resilient to jitter and packet losses, resulting in an improved Quality of Experience for final users.

Another embodiment enabled by the adoption of the present invention is an application for MMT multihomed receiver devices that offer the functionality of managing the bandwidth of the associated network interfaces by setting the limits of bandwidth usage. In this situation, the scheduler module described by this invention will also act as a resource administrator by assigning network paths to video packets taking into account the user predefined parameters. This way, final users can have a fine control of their data resources usage.

The MMT standard has already been adopted by other standards, such as the ATSC 3.0, and it is expected that it will soon fully replace the widely adopted, but outdated, MPEG-2 TS (Transport Stream) protocol. The reason is that MMT was designed to cover all the functionalities specified by the MPEG-2 TS standard and to add new features for handling several broadband/broadcast use cases. The adoption of MMT can be implemented in various market segments such as digital TVs, set-top boxes, AR/VR/MR devices and mobile phones.

An infringement of this invention by third-party products could be discovered by monitoring the traffic load behavior of each associated network interface in a multipath media delivery system based on MMT. Since the prior art did not propose any similar solution for MMT multipath transmission systems, a network packet parser can be used to test if, in a scenario of congested networks, the scheduling strategies proposed in this invention can be identified. One evidence would be MMT-based systems that effectively recover from congestion by rerouting traffic, achieving load balance and reducing jitter and packet losses.

Some advantages obtained by the present invention from the teachings of the prior art comprise:

Increased Goodput: by efficiently employing more than one single transmission path, the application can aggregate all available bandwidths in multiple transmission paths and increase the final goodput. Therefore, more information can be sent over the same period and videos of better quality and/or higher resolutions can be transmitted to the final user;

Reduced Number of Packet Losses: in congested path situations, data traffic can be reduced by shifting part of it (or all of it) to alternate transmission paths in better conditions. Therefore, the total number of network packets lost due to congestion will be reduced resulting in a more stable streaming service. In the simulations performed with this invention (detailed in Section 9), it was possible to reduce the number of lost packets up to 90% when compared with a simple scheduling strategy.

Decreased Delay: besides decreasing delay by employing more than one single transmission path, the present invention incorporates a discard strategy to discard packets that would be certainly lost in situations where congestion is spread over all (or most of the) transmission paths.

Improved User Quality of Experience: due to the reduced number of packet losses, the quality of the video received by the final user will be significantly improved. The present invention also includes a content-aware approach to better protect against losses the video packets that have a higher impact on the perceived quality of experience. In the simulations detailed in Section 9, when compared with a simple scheduling strategy, improvements are clearly shown by computed objective quality metrics of around 12 dB for PSNR (Peak Signal-to-noise Ratio) and 0.15 for SSIM (Structural Similarity).

Addition in MMT Standard: the possibility of adding the present invention to the MMT standard is an advantage due to the upcoming expected worldwide adoption of the MMT protocol for digital television broadcasting/broadband transmission systems. It must be highlighted that the MMT protocol is already adopted as part of other important standards, such as ATSC 3.0 and Super HiVision system. Therefore, the present invention also has a high potential of being widely used.

Easy Implementation: the present invention can be implemented as a module additional compatible with MMT and does not require any changes in the current MMT protocol, since the standardized MMT message signaling mechanism is used to provide the required feedback information.

Impact on a Broad Range of Products: all products implementing the MMT standard, such as smartphones, smart TVs, tablets, and AR/VR/MR devices, will be able to use the present invention.

BRIEF DESCRIPTION OF DRAWINGS

The present invention will become clearer from the detailed description of a preferred exemplary embodiment and the non-limitative figures attached, in which.

DETAILED DESCRIPTION OF THE INVENTION

The following description is presented to enable any person skilled in the art to make and to use the embodiments, and is provided in the context of particular applications and their requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features herein disclosed.

Figure 7:
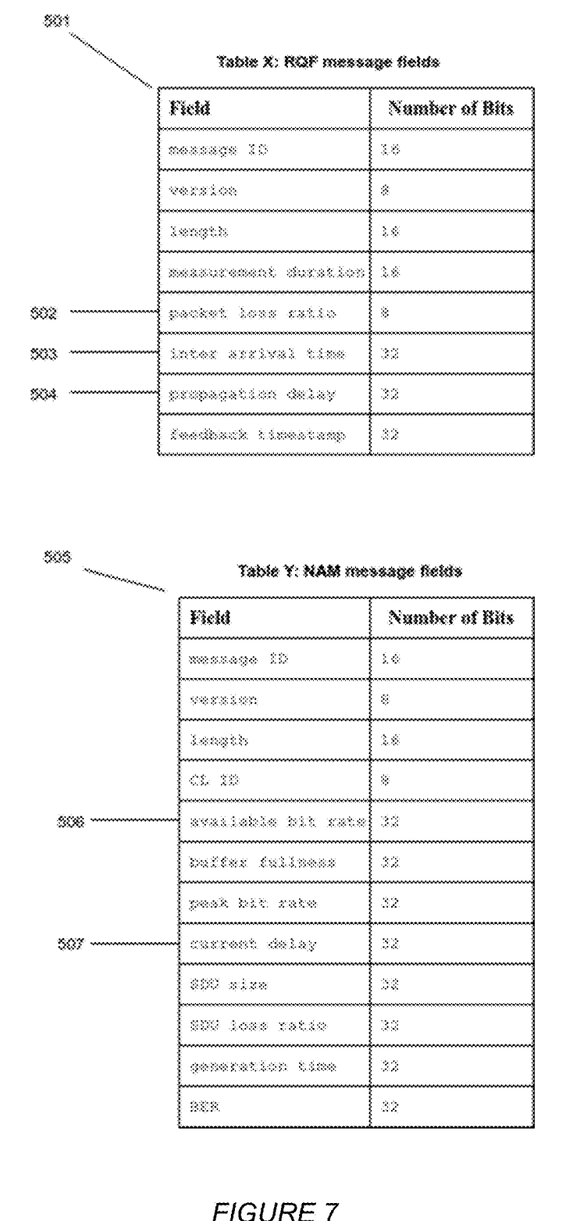
FIG. 7 shows the RQF and NAM signaling message fields.
Figure 8:
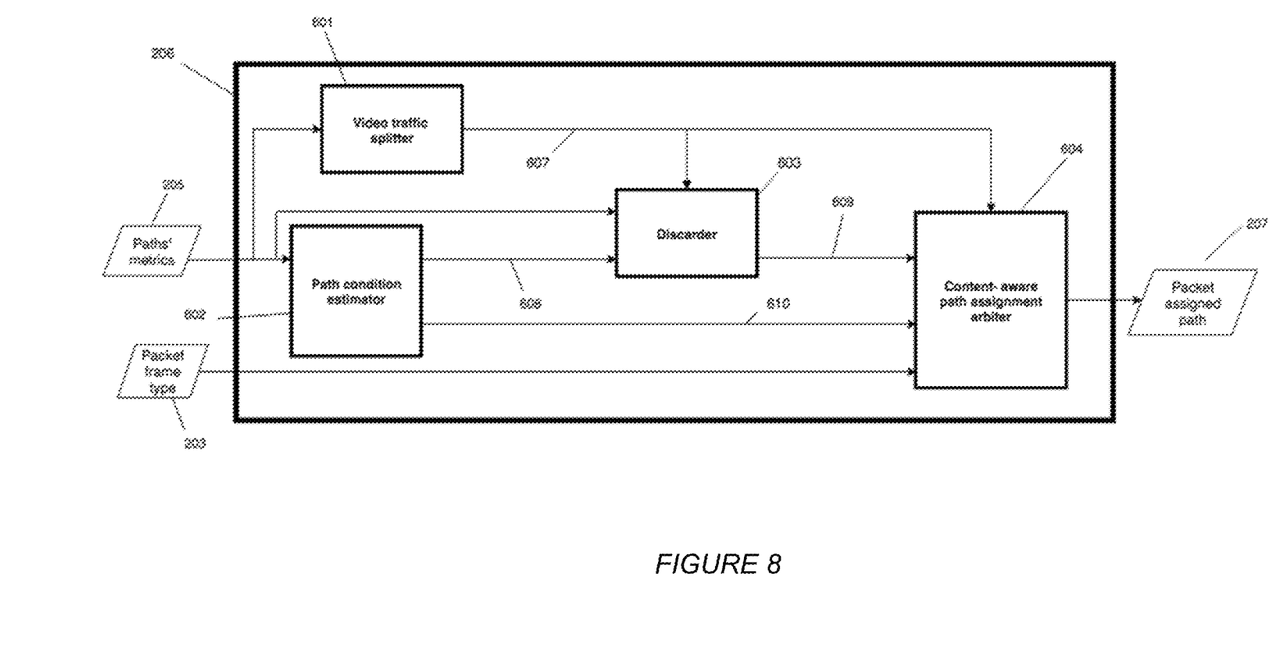
FIG. 8 illustrates an overview of the proposed scheduler module.
Figure 9:
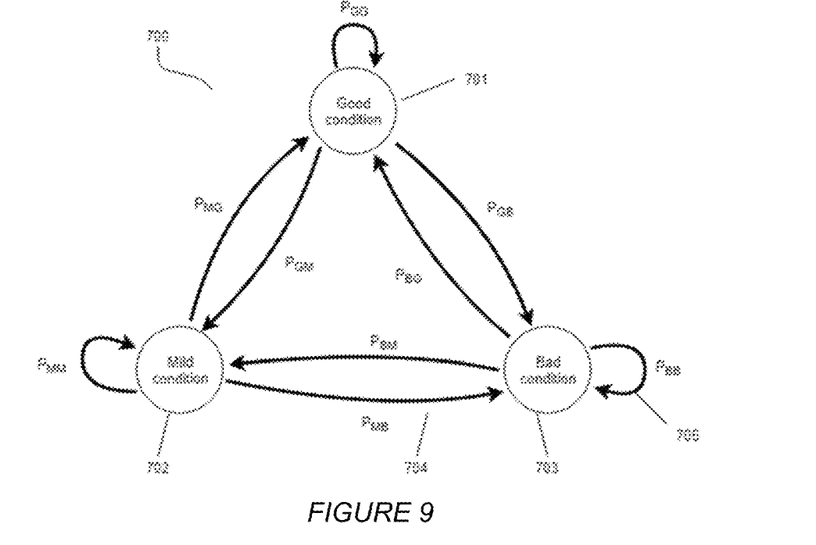
FIG. 9 illustrates the Markov model used for path condition estimation.

The detailed description of the present invention follows a top-down approach. Hence, initially, a possible multipath mobile video streaming scenario configuration is presented (FIG. 1) and two use scenarios embodiments are illustrated (FIGS. 2 and 3) to clarify the purpose of the invention. In the sequence, an overview of the proposed multipath system (FIG. 4) is depicted, and then we delve into the details of the video parsing operations (FIG. 5), signaling mechanism (FIGS. 6 and 7) and the dataflow of the scheduler component (FIGS. 8 and 9). After presenting the details of the present invention, a set of experiments is presented as a proof of concept of the proposed strategy. This way, the network simulation scenario is described (FIG. 10) together with the plots of network performance in terms of goodput (FIGS. 11 and 12) and a table with comparison results (FIG. 13).

Multipath Mobile Video Streaming Scenario

Figure 1:
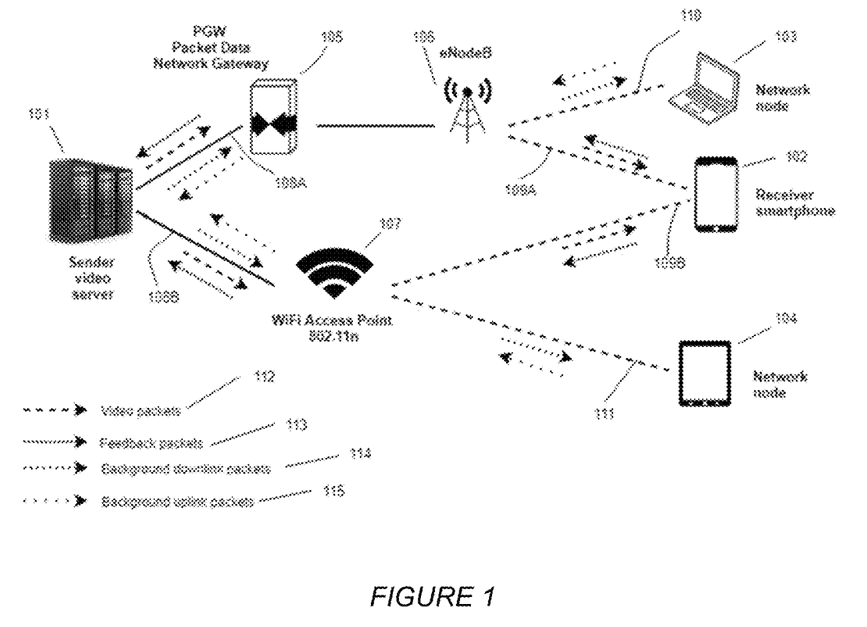
FIG. 1 illustrates an example of multipath mobile video streaming scenario.

FIG. 1 illustrates an example of a multipath mobile video streaming use scenario (100) according to the disclosure of the present invention. This scenario is composed of one sender (101) and one receiver (102), both using multipath connections over heterogeneous wireless network paths for video data transmission. In this example, there are two other network nodes, represented by a laptop (103) and a tablet (104). However, an additional number of network nodes could be added in the simulated network, limited by the network throughput and processing capabilities.

The sender (101) is a video server with two associated network paths and can simultaneously transmit data over them. In this example, the video server (101) provides one LTE network path and one Wi-Fi network path. Based on this setup, the video server (101) can communicate with the receiver through the LTE network path (108A) using the network gateway (105) and the eNodeB (106). Additionally, it can simultaneously communicate with the receiver (102) through the other associated network path (108B) using the WiFi Access Point (107). Due to the different technologies and propagation characteristics, the associated network paths have different connection characteristics (e.g., bandwidth, delay and packet loss rate). It is important to note that other technologies of packet network communication (different from Wi-Fi and LTE) could be used in similar multipath mobile video streaming scenarios.

In this depicted example, the receiver (102) is a smartphone. However, it could be a tablet or a laptop or any other portable device. The receiver (102) provides two packet network interfaces, one LTE and one Wi-Fi. This way, the receiver (102) can communicate with the server through a network path (109A) using the provided eNodeB (106) and the packet data network gateway (PGW) (105) and, additionally, it can simultaneously communicate with the server through the other associated network path (109B) using the Wi-Fi access point (107). The receiver (102) can receive video packets (112) through both its network paths from the video server (101) and can send feedback packets (113) to the video server (101) through both network paths. The receiver (102) can also inform the sender (101) about any required setting, such as bandwidth usage limitation.

The main purpose of adding the additional network nodes (103) and (104) is to create a more realistic scenario with background traffic generated by them. The network node (103) can communicate with the video server through eNodeB (106) and packet data network gateway (PGW) (105) via network path (110). The network node (104) can communicate with the server through WiFi Access Point (107) via network path (111). The background traffic is composed by the downlink traffic (114) generated by the server (101) to the network nodes (103) and (104), and by the uplink traffic (115) generated from the network nodes (103) and (104) back to the video server (101).

Noted that FIG. 1 is an example of multipath mobile video streaming scenario and it does not limit the scope of this disclosure to the specific aforementioned configuration.

Implementation of Use Scenario 1: Smartphone in a Moving Vehicle

Figure 2:
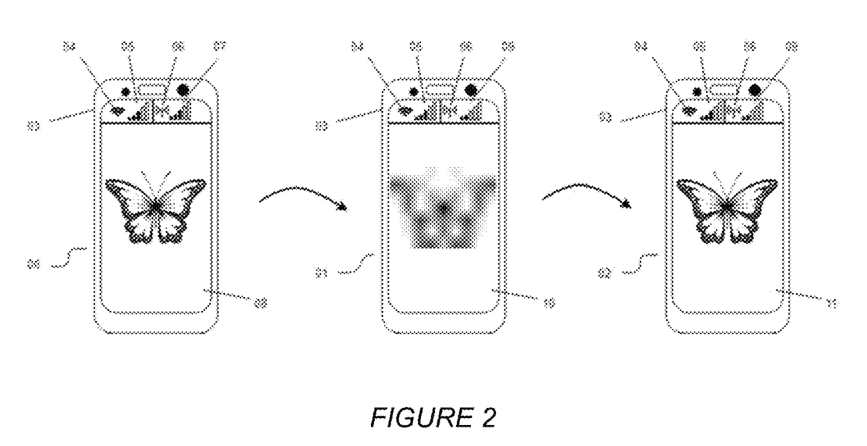
FIG. 2 illustrates one embodiment of a use scenario of smartphone equipped with multi-path capabilities of the present invention in a moving vehicle.

FIG. 2 illustrates a sample embodiment of a possible multipath transmission using the present invention. The solid arrows represent the transition of the actions that will be described. The first action (00) starts when a user is watching a video in his/her smartphone (03) at a moving vehicle (such as, in a public transport bus), where the smartphone (03) is connected to both Wi-Fi (04) and LTE (06) network paths. In this sample embodiment, the signal reception conditions are not ideal and the received signal intensity, of both Wi-Fi (05) and LTE (07), is not high. However, by using the path-and-content-aware scheduling strategy for multipath video streaming developed in the present invention, the smartphone (03) is still able to display the video content with satisfactory QoE (08). Then, in action (01), the bus starts moving and the LTE (09) signal intensity decreases to even lower levels during a random period of time. This condition would lead to a degraded video quality (10) decreasing the final user QoE. However, due to the improvements added to the MMT protocol by the present invention, the video traffic can be rerouted to the Wi-Fi channel and the quality can be fast recovered (11) after a short time (action 02). The present invention can keep the QoE in satisfactory levels because the scheduling strategy adaptively copes with unstable multipath communication conditions.

Figure 3:
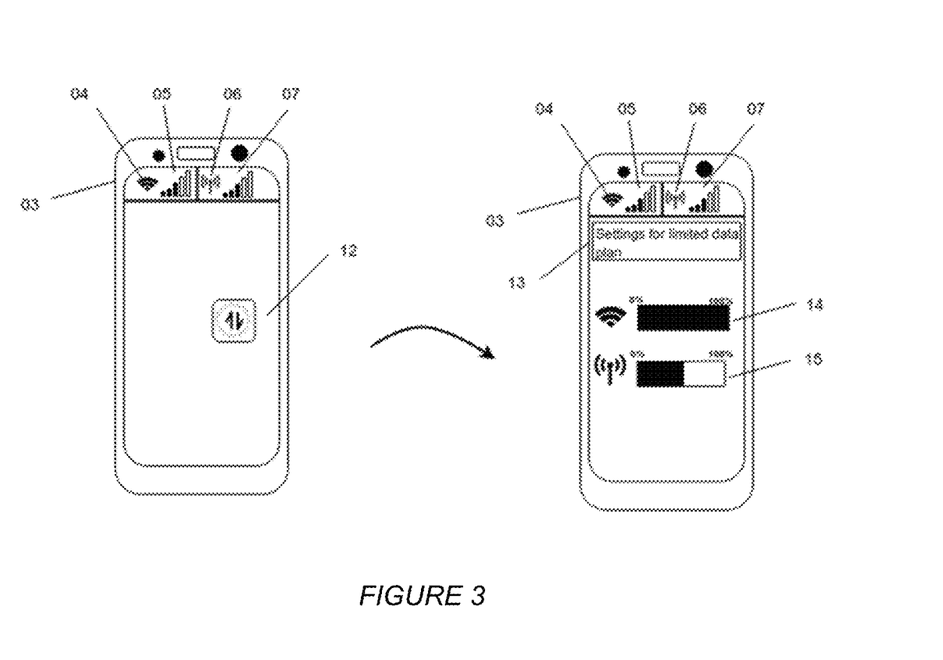
FIG. 3 illustrates another embodiment of the present invention represented by a smartphone native application that can control the bandwidth usage in order to save the user mobile data plan.

Implementation of Use Scenario 2: Smartphone Native Application to Control Bandwidth Usage FIG. 3 illustrates another use scenario embodiment of a possible multipath transmission environment using the present invention. The action starts with a person using the smartphone (03), where a native application (12) capable of accessing the network settings of each associated path (13) is installed. In this embodiment, the user can adjust the bandwidth usage limits, in percentage, considering his/her contracted data plan for Wi-Fi (14) and for LTE (15). In this scenario, if the user, for instance, wants to save the LTE data usage, he/she can set it in the application by selecting a lower percentage (12). This configuration is sent to a remote server, equipped with the path-and-content-aware scheduling strategy for multipath video streaming developed in the present invention. Then, the scheduler module of the aforementioned server will be able to adjust the packet ratio of each path taking into account the limits informed by the application while still being capable of ensuring a satisfactory QoE for the final user.

Overview of the Multipath System

Figure 4:
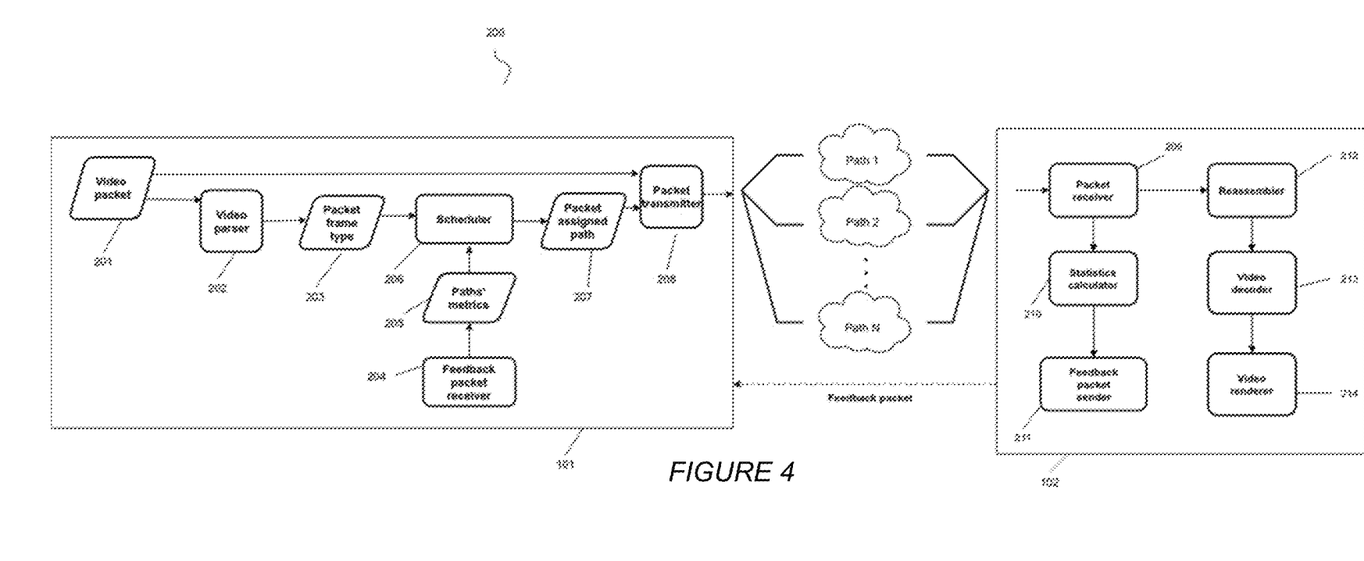
FIG. 4 illustrates a flowchart overview of the proposed multipath system.
Figure 5:
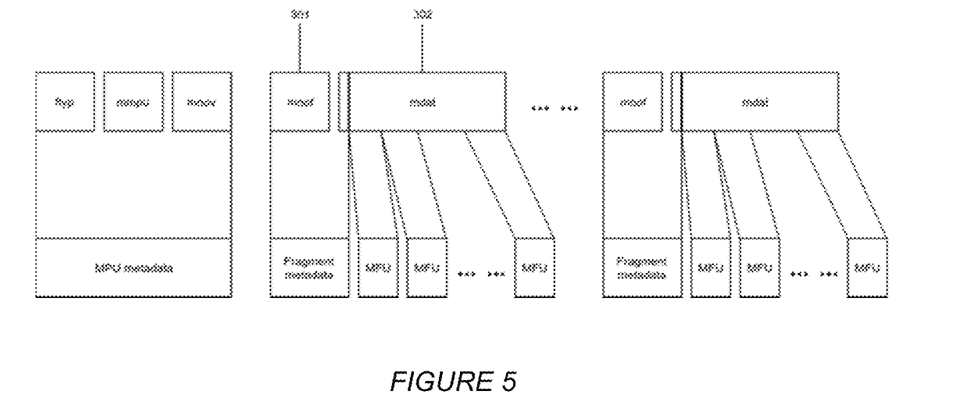
FIG. 5 illustrates the ISOBMFF structure of a fragmented video sequence.

FIG. 4 shows a block diagram of the proposed multipath system (200). In this system, a unicast video transmission employing the Multipath User Datagram Protocol (MPUDP) over a heterogeneous wireless network is considered. The purpose of the system (200) is to achieve an enhanced-quality real-time video streaming solution by adopting a path-and-content-aware packet scheduling strategy for the MMT protocol. In order to do this, the system follows the flowchart specified by the modules at both sender (101) and receiver (102) depicted in Picture 4. Each rectangular box is a module and each parallelogram represents input or output data. The arrows represent the precedence of activities.

At the sender side (101), there are four modules: video parser (202), feedback packet receiver (204), scheduler (206), and packet transmitter (208). Firstly, the video packets (201) are handled by the video parser (202) in order to extract the frame type of the video content of each data packet. The video parser module (202) informs the video packet frame type (203) to the scheduler module (206), which will lately use this information in the process of path scheduling of each packet. Additionally, the feedback packet receiver module (204) periodically receives feedback packets from the receiver (102). This module (204) informs the paths' metrics (205) to the scheduler module (206) and discards overdue received feedback packets. In the sequence, the scheduler module (206) evaluates the received paths' metrics and uses them in the process of path scheduling together with the video packet frame type information (203). Finally, the packet transmitter module (208) transmits each video packet (201) based on the path assignment (207) information received from the scheduler module (206).

At the receiver side (102), there are six modules: packet receiver (209), statistics calculator (210), feedback packet sender (211), reassembler (212), video decoder (213) and video renderer (214). The packet receiver module (209) receives the transmitted video packet. After a predefined interval time (or a certain number of received packets), the paths' metrics (such as, goodput, average delay, number of lost packets and jitter) are periodically computed at the statistics calculator module (210) in order to constantly monitor the quality of the network paths. Then, the feedback packet sender module (211) is responsible to send this information in a feedback packet back to the sender (101) through the best path by assembling two MMT signaling messages. Considering the relevance of the feedback information for the scheduling process, a scheduler is also implemented in the receiver side in order to estimate the best path to send this information back to sender, instead of using the same receiving path.

Figure 6:
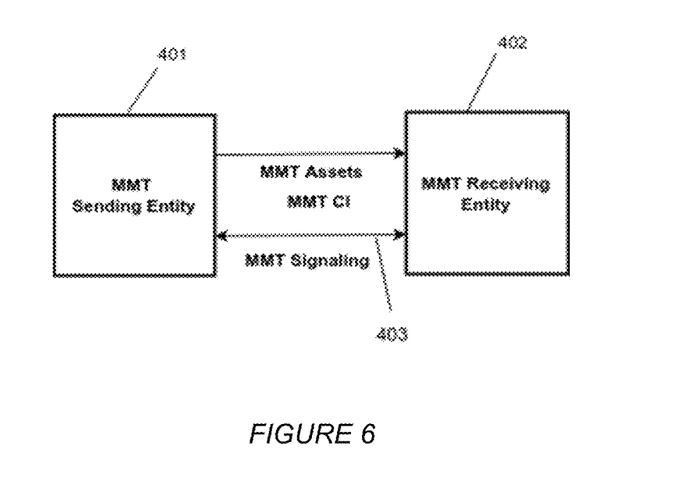
FIG. 6 illustrates the MMT signaling communication flow.

The MMT protocol provides a signaling mechanism, illustrated in Picture 6, to deliver feedback information to the sender. It defines a communication flow (403) of signaling messages to exchange configurations between any MMT sending entity (401) and any MMT receiving entity (402). Two messages for delivering feedback information to the sender, illustrated in Picture 7, were used in the present invention to fulfill this need: Reception Quality Feedback (RQF) (501) and Network Abstraction for Media Feedback (NAMF) (505). The following RQF message fields were used: packet loss ratio (502) for the packet loss, inter arrival time (503) for the jitter and propagation delay (504) for the one-way delay. The fields of the NAM message used were the available bit rate (506) for the goodput and the current delay (507) for the highest one-way delay.

If the packets received by the packet receiver module (209) are not overdue, they are sent to the reassembler module (212), which is responsible to reassemble the encoded video bitstream. After this stage, the reassembled bitstream is sent to the video decoder module (213) for error concealment and decoding. Finally, the decoded video will be ready to be displayed by the video renderer module (214).

Video Parser Module

The video parser module (202) retrieves the information about the frame type of each MMT video packet content. It implements a parser capable of accessing the ISOBMFF structures (depicted in FIG. 5) of the fragmented video sequence and parse the first bits of each segment to read its frame type. The video parser looks for the fragment header, represented by the atom moof (301), and with this information, it can reach the content of the fragment, which is stored in the element mdat (302). As examples, this parser could implement the H.264 or the HEVC specifications. The frame type is stored in the mdat element (302) and the video parser sends this information to the scheduler to be used to assign the best path for the packet.

Scheduler Module

The scheduler module (206) is the main module of the present invention. It monitors the current condition of each path through the received paths' metrics (205) and takes into account the content of each video packet (203) to assign the best path (207) for its transmission. Therefore, it applies a path-and-content-aware scheduling strategy. Besides, this invention considers a heterogeneous network context, where it is important to properly allocate transmission bit rates that cope with each path capacity and its current condition in order to avoid either congestion or underutilization of network resources. Effectively splitting the video traffic through all the available paths is also a task performed by the scheduler module (206).

FIG. 8 depicts a block diagram of the scheduler module architecture (206) of the present invention. It is composed by four sub-modules: video traffic splitter (601), path condition estimator (602), packet discarder (603) and content-aware path assignment module (604).

The video traffic splitter module (601) splits the video traffic in order to cope with the conditions of the associated heterogeneous paths and executes the network load balancing algorithm. It receives the paths' metrics (205) as an input and this information is used to estimate the capacity of each path to deliver video data to the receiver. Then, considering the estimated path capacity, the video traffic splitter module (601) is responsible for the definition of a packet rate for each path (607).

In an embodiment of the present invention, the path's metrics goodput and average one-way delay are considered to estimate paths' capacity. Therefore, a higher rate is assigned to the path with higher goodput and lower average one-way delay.

The path condition estimator module (602) receives the paths' metrics (205) as an input. This information is used to estimate paths' conditions and transition probabilities (608). In an embodiment of the present invention, the path condition estimation problem can be defined as a three-state Markov model (700) where each state represents one path condition, for instance: good condition (701), mild condition (702) and bad condition (703). A matrix P of transition probabilities among the three states is computed according to the following equation and is periodically updated by the path condition estimator module (602):

$$p_{i,j} = \frac{c_{i,j} + 1}{\sum_{j=1}^{N} c_{i,j} + N}$$

where $p_{i,j}$ is the transition probability from state i to state j and N is the total number of paths. A matrix C is also kept to store the number of transitions from each state i to state j ($c_{i,j}$).

Following the aforementioned embodiment, in order to define the path condition state, two specific thresholds are used: one for the one-way delay metric and the other for the packet loss rate threshold metric. These values can be configured based on the use case.

In an embodiment of the present invention, the predefined one-way delay threshold value can be set to, for example, 50 milliseconds following the recommendations described in Wu et al. "Delay-constrained high definition video transmission in heterogeneous wireless networks with multi-homed terminals", *IEEE Transactions on Mobile Computing*, vol. 15, no. 3, pp. 641-655, 2016. This value acts as the maximum delay for achieving high-quality multipath HD video transmission in heterogeneous wireless networks.

In one possible embodiment of the present invention, the paths can be classified as follows:
A path is in good condition (701) when the highest value of the one-way delay is equal to or less than the one-way delay threshold and if its packet loss rate is less than the predefined packet loss rate threshold.
A path is in mild condition (702) when the highest value of the one-way delay is equal to or less than the one-way delay threshold and the packet loss rate is higher than packet loss rate threshold.
A path is in bad condition (703) when the highest value of the one-way delay is higher than the one-way delay threshold or its average one-way delay is higher than the value of the weighted moving average of the one-way delay plus jitter.

The discard module (603) receives the estimated packet rates (607), the paths' metrics (205), paths' conditions and state transition probabilities (608) as inputs. In a possible embodiment of the present invention, the discard strategy is applied if the path is in bad condition or if the probability of going from mild condition to bad condition is higher than the probability of going from mild condition to good condition. This aforementioned discard strategy is defined in the following way:
If the path is in good condition (701), no packet will be discarded.
If the path is in mild condition (702), the probabilities of moving to good condition (701) or to bad condition (703) are checked. The history of path's metrics is monitored in order to identify if there is a higher probability of moving to good condition (701) or to bad condition (703). This way, the last computed path's metrics are compared with the metrics received in the current feedback packet. While several metrics could be used, in a possible embodiment of the present invention, the number of lost packets, jitter and one-way delay can be considered. If the probability of moving to good condition (701) is increasing, then no packet will be discarded. However, if the values of the three-monitored path's metrics increase, the path condition is getting worse and the probability of moving to bad condition (703) is higher. Therefore, the discarder employs the probability of moving from mild to bad condition ($p_{MB}$) (704) to define the packet discard rate (609).
If the path is in bad condition (703), then the discarder (603) uses the probability of staying in bad condition (703), $p_{BB}$(705) calculated by the path condition estimator (602), to estimate the packet discard rate (609). In other words, the higher the probability of keeping in bad condition (703), more packets will be discarded.

Based on the described embodiment, the discarder module (603) is able to estimate the packet discard rate (609) according to the condition of each path. Other possibility for discard strategy is estimating the playback deadline and just discarding the video packets that have no chance to arrive in time.

Finally, the content-aware path assignment module (604) is responsible for assigning the most appropriated path to each packet. It receives the calculated information from the aforementioned modules: estimated packet rates (607), packet discard rates for each path (609), path's conditions estimations (610), and packet frame type (203). Based on all this information, the arbiter module (604) defines the path assignment according to the path-and-content-aware strategy defined in this present invention for each packet (207).

The assignment module (604) considers the video frame type of each packet content to protect I frames and the n nearest P frames, named as near-I (NI) frames in this invention. The reason for protecting NI frames is based on the fact that errors on these first P frames, of a group of pictures (GOP), may have a higher impact on the perceived quality of experience.

In a possible embodiment of the present invention, the strategies defined for protecting I and NI frame packets can be defined as
Avoid discarding packets: I and NI frame packets will never be discarded;
Duplicate I frame packets: when one path is in mild condition (702) and the other path is in bad condition (703) or both paths are in bad condition (703), the content-aware path assignment module (604) duplicates I frame packets and sends them through both paths, in order to increase the probability of successful delivery of such packets. It must be highlighted that NI frame packets will never be duplicated;
Rerouting packets: when one path is in good condition (701) and the other path is in mild condition (702) or bad condition (703), the I frame packets will not be duplicated, but will be sent only through the path in good condition (701);
Default strategy: the assignment module will follow everything that was defined by the other modules. For example, when both paths are in good condition (701) or in mild condition (702), then no packet will be duplicated and the estimated packet rates (607) computed by the video traffic splitter (601) will be applied.

Experiments and Results

In the context of the experiments using the proposed methods of the present invention, we report the results of simulations for the well-known cartoon sequences named Elephants Dream and Big Buck Bunny. Their resolutions are of 1920×1080 and the total number of frames is approximately the same: 15,691 frames for Elephants Dream and 14,315 frames for Big Buck Bunny. The H.264/AVC JM Reference Software was used as the encoding tool and the MP4 fragmentation procedures were done by the GPAC MP4BOX tool. Decoding and error concealment were performed with the FFMPEG tool. The employed GOP structure is IPPPP . . . P and the GOP size is of 16 frames.

In order to compare results in the same network simulation scenario, both sequences were encoded with the same bit rate (4 Mbps). The Big Buck Bunny has more I frame packets and consequently less P frame packets than Elephants Dream. This difference is due to higher amount of texture, details and action in Big Buck Bunny. Only the initial two P frames in the GOP were considered as NI frames. Therefore, the remaining 13 frames in each GOP are regular P frames.

A NS3-DCE model is implemented to simulate the proposed strategy of the present invention in a realistic network scenario. The multipath simulation setup comprises of two wireless networks implemented by the LTE and Wi-Fi modules available in the NS-3 simulation library. The different specifications and heterogeneity between LTE and WiFi are among the big challenges of the present invention for properly splitting video traffic and achieving load balancing. For the LTE path bandwidth and delay were defined, respectively, as 18.3 Mbps and 15 milliseconds. The 802.11n/5 GHz model was chosen for the Wi-Fi path.

Therefore, bandwidth and delay were defined for the Wi-Fi path, respectively, as 54 Mbps and 10 milliseconds.

Figure 10:
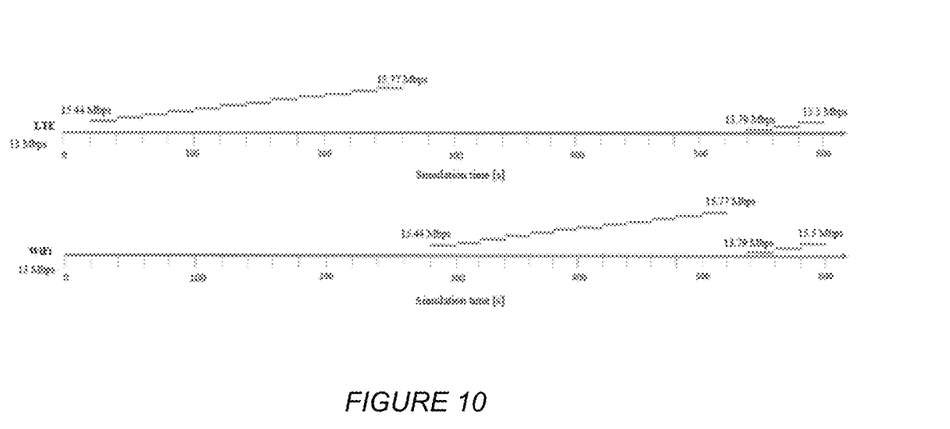
FIG. 10 illustrates the variable background traffic setup of an embodiment implemented as proof of concept to first simulate congestion separately in each path and then simultaneous congestion in both paths.

Constant uplink and variable downlink background traffics were added in the NS3 simulation, as illustrated in FIG. 10, to stress out the proposed scheduling strategy in different network congestion situations. The downlink background traffic is generated by the server and initially set as 13 Mbps for both paths. On the other hand, the uplink background traffic is generated by the network nodes and set as 2 Mbps, in accordance to real network scenarios where the uplink traffic is smaller than the downlink traffic.

The proposed simulation environment of this proof of concept experiment does not apply Forward Error Correction (FEC) technique. Some reviewed studies stated that the acceptable packet loss rate is set to 1% when using FEC. This way, in this experiment, this threshold was slightly extended to 2%.

For the simulation, the uplink background traffic is kept constant, but the downlink background traffic is periodically increased separately for each path, as illustrated in FIG. 10. In the first part of the simulation (approximately until 250 ms), the background traffic of only LTE path is increased while the background traffic of the Wi-Fi is kept constant. In the second part (approximately until 500 ms), the opposite behavior is simulated, and the background traffic of the Wi-Fi path is increased while the background traffic of the LTE is kept constant. Finally, after 500 ms, background traffic is slightly increased in both paths to simulate simultaneous congestion in LTE and Wi-Fi.

In order to turn the simulation setup more real, the NS3 simulator channel random error model was employed to capture the effects of noisy wireless paths. Loss rate values were set as 1% for the LTE path and 0.1% for the Wi-Fi path.

Figure 11:
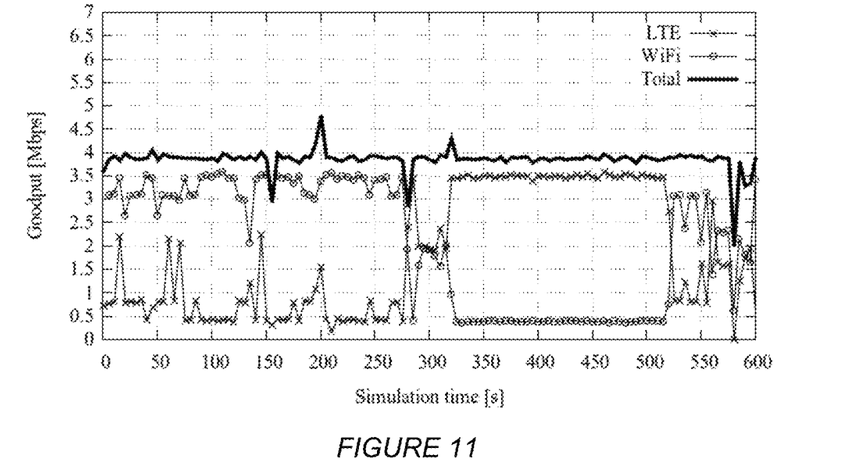
FIG. 11 shows a plot of the simulation results of the embodiment implemented as proof of concept for packets evenly split through Wi-Fi and LTE communication paths.

The following metrics were computed to evaluate the performance of the proposed path-and-content-aware scheduling strategy of the present invention: goodput, packet loss rate, PSNR and SSIM. The results were compared with a simple scheduling strategy where packets were evenly split in both communication paths. However, it is important to note that, even though evenly splitting packets is a simple scheduling strategy, it can take advantage of the network multipath capabilities and increase the total achieved goodput, as can be seen in Picture 11 for the transmission of the video sequence Elephants Dream.

Figure 12:
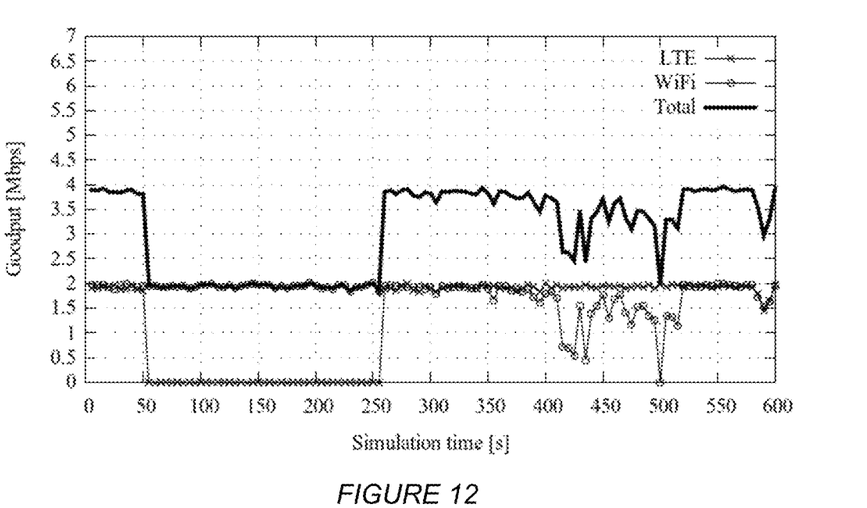
FIG. 12 shows a plot of the simulation results of the embodiment implemented as proof of concept using the path-and-content-aware scheduling strategy defined in the present invention.
Figure 13:
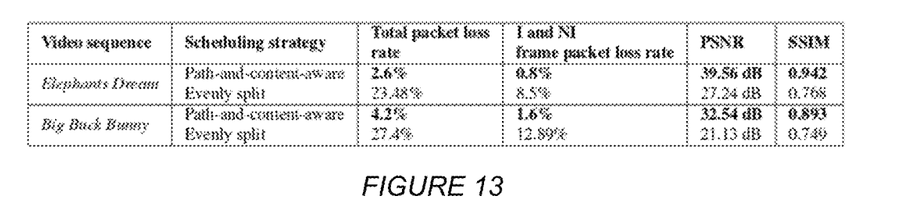
FIG. 13 shows a table with the comparison results of the embodiment implemented as proof of concept between different scheduling strategies.

When comparing FIG. 11 with FIG. 12, one can note that, in FIG. 12, the total goodput is more stable when the proposed scheduling strategy of the present invention is applied. Load balancing is also clearly achieved between both paths and the higher inherent capacity of the Wi-Fi path is exploited. In addition, congestion is properly handled by the scheduler (FIG. 12) by switching traffic among paths and keeping a stable total goodput of 4 Mbps, except for the last part where both paths get congested. The goodput decrease in this last part is due not only to congestion, but also to the packets lost because of the discard strategy applied by the scheduler to avoid even more congestion FIG. 13 shows a comparison between the packet loss rates for the scenarios simulated in FIGS. 11 and 12 with Elephants Dream. Results are also provided for Big Buck Bunny, considering the same simulation scenarios. One can see in FIG. 13 that, due to the video sequences differences previously mentioned and shown in FIG. 13, Big Buck Bunny has more losses than Elephants Dream in all compared conditions. However, one common result for the two sequences and all compared conditions is the significant packet loss rate reduction, varying from 85% to 91%, achieved by the path-and-content-aware scheduling strategy of the present invention when compared to the evenly split scheduling strategy. For instance, the total packet loss rate of Elephants Dream is reduced from 23.48% to only 2.6%, which corresponds to 88.93% rate reduction.

Results in FIG. 13 also show the effectiveness of the proposed scheduling strategy in the present invention to better protect I and NI frame packets. For both video sequences, the percentage of lost I and NI frame packets over the total number of lost packets decreases. For instance, with the proposed strategy of the present invention, I and NI frame losses for Elephants Dream decrease to only 0.8%, which corresponds to 30.76% of the total losses (2.6%). When evenly split scheduling strategy is applied, I and NI losses correspond to 36.20% of total losses. Therefore, the rate is reduced from 36.20% to 30.76%. Similar results are obtained for Big Buck Bunny, where the rate is reduced from 46.71% to only 38.09%.

Regarding the objective video quality metrics results, the PSNR and SSIM values of Picture 13 attest to our objective of improving the QoE of end users by employing the proposed strategy of the present invention. One can see that PSNR and SSIM gains of, respectively, 12.34 dB and 0.174 can be achieved for Elephants Dream while similar gains of 11.41 dB and 0.144 can be achieved for Big Buck Bunny.

Under the simulated network conditions, as shown in FIG. 10, QoE would be very poor, almost completely degrading the whole sequence with PSNR values as low as 21.13 dB. Even in this challenging scenario, the proposed scheduling strategy of the present invention was able to keep the QoE in higher levels while optimizing the total network goodput.

Although the present disclosure has been described with respect to certain preferred embodiments, it is not intended to limit the disclosure to such particular embodiments. Rather, it is intended to encompass all possible alternatives, modifications and equivalences within the spirit and scope of the disclosure, as defined by the appended claims.

The invention claimed is:

1. A method for digital video transmission in real time to multi-homed devices over heterogeneous networks by adopting a packaging forwarding strategy with path and content monitoring to a MPEG media transport protocol (MMT) comprising:
    extracting a frame type from a video content of each video packet through a video parser on a sender side;
    informing a video packet frame type to a scheduler module through the video parser;
    receiving periodic feedback packets from a receiver in a feedback packet receiving module that informs the path metrics for the scheduler module and discards overdue received feedback packets, wherein the scheduler module includes four sub-modules: a video traffic splitter, a path condition estimator, a packet discarder, and a video content-aware path assignment module, wherein path condition estimation by the path condition estimator is a three-state Markov model wherein each state represents one path condition among a good condition, a mild condition, and a bad condition;
    evaluating the paths metrics received in the scheduler module and using them in a process of path scheduling together with frame type information of a video frame; and
    transmitting each video packet to a packet receiver by a packet transmitter module based on path assignment information received from the scheduler module.

2. The method for digital video transmission according to claim 1, wherein evaluating the received paths' metrics comprises applying a packet discard strategy by the packet discarder module if the path is in bad condition or if a probability of going from mild condition to bad condition is higher than a probability of going from mild condition to good condition.

3. The method for digital video transmission according to claim 1, wherein the path assignment by the content-aware path assignment module is computed using calculated information from estimated packet rates, packet discard rates for each path, path's conditions estimations, and video packet frame type.

4. The method for digital video transmission according to claim 1, wherein the video frame type of each packet content is used to protect I frames and the n nearest P frames, named as near-I (NI) frames.

5. A method for receiving real-time digital video in multihomed devices over heterogeneous networks by adopting a packaging forwarding strategy with path and content monitoring to an MPEG media transport protocol (MMT), the method comprising:
  receiving a video packet transmitted in a packet receiving module;
  periodically computing path metrics in a statistics calculator after a predefined time interval;
  sending through a feedback packet sender module the path metrics computed in a feedback packet back to a sender through a best estimated path by a scheduler module on a receiver side using a plurality of MMT signaling messages;
  sending undelayed packets received by a packaging receiving module to an encoded video bitstream reassembling module;
  sending the encoded reassembled bitstream to a video decoder module; and
  displaying decoded video stream through a video renderer module.

6. The method for receiving according to claim 5, wherein the paths' metrics comprise goodput, average delay, number of lost packets and jitter.

7. The method for receiving according to claim 5, wherein the plurality of MMT signalizing messages consist in a reception quality feedback (RQF) message and a Network Abstraction for Media Feedback (NAMF) message.

8. A system for transmitting/ receiving digital real-time video on multi-homed devices over heterogeneous networks by adopting a packet scheduling strategy with path and content monitoring for an MPEG media transport protocol (MMT), the system comprising:
  implemented modifications on a transmitter side comprises four modules: video parser, feedback packet receiving module, scheduler module and packet transmitter module, wherein
  video packets are handled by the video parser to extract frame type from video content of each data packet;
  the video parser module informs the video packet frame type to the scheduler module, which will subsequently use this information in a path scheduling process of each packet; the feedback packet receiving module periodically receives feedback packets from the receiver, informs path metrics for the scheduler module, and discards overdue received feedback packets, wherein the scheduler module includes four sub-modules: a video traffic splitter, a path condition estimator, a packet discarder, and a video content-aware path assignment module, wherein path condition estimation by the path condition estimator is a three-state Markov model wherein each state represents one path condition among a good condition, a mild condition, and a bad condition;
  the scheduler module evaluates metrics of received paths and uses them in a process of path scheduling along with frame type information of a video frame; and
  the packet transmitter module transmits each video packet based on path assignment information received from the scheduler module; and
  a receiver side comprises six modules which interact to each other: packet receiving module, statistics calculator module, feedback packet sender module, packet reassembler module, video decoder and video renderer, wherein
  the packet receiving module receives a transmitted video packet;
  after a predefined time interval, path metrics are periodically computed in the statistics calculator module;
  the feedback packet sender module sends this information in a feedback packet back to a sender through a best path by assembling two MMT signaling messages; and
  a scheduler module is also implemented on the receiver side to estimate the best path to send this information back to the sender instead of using the same receiving path.

* * * * *

UNITED STATES PATENT AND TRADEMARK OFFICE
CERTIFICATE OF CORRECTION

PATENT NO. : 10,887,151 B2  
APPLICATION NO. : 16/387249  
DATED : January 5, 2021  
INVENTOR(S) : Jean Felipe Fonseca de Oliveira et al.

Page 1 of 1

It is certified that error appears in the above-identified patent and that said Letters Patent is hereby corrected as shown below:

On the Title Page

Item [30] (Foreign Application Priority Data), Line 32 (approx.):
Delete "2018 070605 5" and insert -- 10 2018 070605 5 --, therefor.

Item [30] (Foreign Application Priority Data), Line 33 (approx.):
Delete "2018 076952 9" and insert -- 10 2018 076952 9 --, therefor.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*